(12) United States Patent
Wojnowicz

(10) Patent No.: US 11,637,858 B2
(45) Date of Patent: Apr. 25, 2023

(54) DETECTING MALWARE WITH DEEP GENERATIVE MODELS

(71) Applicant: Cylance Inc., Irvine, CA (US)

(72) Inventor: Michael Thomas Wojnowicz, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 286 days.

(21) Appl. No.: 16/887,586

(22) Filed: May 29, 2020

(65) Prior Publication Data

US 2021/0377282 A1  Dec. 2, 2021

(51) Int. Cl.
*H04L 9/40* (2022.01)
*G06N 7/00* (2023.01)
*H04L 9/06* (2006.01)

(52) U.S. Cl.
CPC ........... *H04L 63/145* (2013.01); *G06N 7/005* (2013.01); *H04L 9/0643* (2013.01); *H04L 63/1408* (2013.01); *H04L 63/20* (2013.01)

(58) Field of Classification Search
CPC .......................... H04L 63/145; H04L 63/1408
USPC ........................................................ 726/23
See application file for complete search history.

(56) References Cited

U.S. PATENT DOCUMENTS

| 10,339,472 | B2 * | 7/2019 | Sadaghiani ........... G06F 21/577 |
| 2015/0128263 | A1 | 5/2015 | Raugas et al. |
| 2017/0149813 | A1 | 5/2017 | Wright et al. |
| 2020/0074238 | A1 | 3/2020 | Umeno et al. |

OTHER PUBLICATIONS

European Search Report issued for EP Application No. 21176485.7, dated Oct. 11, 2021.

* cited by examiner

*Primary Examiner* — Anthony D Brown
(74) *Attorney, Agent, or Firm* — Jones Day

(57) ABSTRACT

Features are extracted from an artifact so that a vector can be populated. The vector is then inputted into an anomaly detection model comprising a deep generative model to generate a first score. The first score can characterize the artifact as being malicious or benign to access, execute, or continue to execute. In addition, the vector is inputted into a machine learning-based classification model to generate a second score. The second score can also characterize the artifact as being malicious or benign to access, execute, or continue to execute. The second score is then modified based on the first score to result in a final score. The final score can then be provided to a consuming application or process. Related apparatus, systems, techniques and articles are also described.

20 Claims, 3 Drawing Sheets

DETECTING MALWARE WITH DEEP GENERATIVE MODELS

TECHNICAL FIELD

The subject matter described herein relates to enhanced techniques for characterizing artifacts as likely being malicious using deep generative models.

BACKGROUND

Hackers are becoming increasingly sophisticated in their attempts to access various computing systems by developing malware that is designed to spoof or otherwise bypass conventional anti-virus solutions. In particular, adversarial techniques are being adopted in which various artifacts encapsulating malware are iteratively and automatically modified until such time as such artifacts are improperly classified by an anti-virus solution as being benign. At the same time, malware detection systems are becoming increasingly multimodal, integrating information from multiple heterogeneous information sources when coming to a final judgment.

SUMMARY

In a first aspect, an artifact is received. Thereafter, features are extracted from the artifact so that a vector can be populated. The vector is then inputted into an anomaly detection model comprising a deep generative model to generate a first score. The first score can characterize the artifact as being malicious or benign to access, execute, or continue to execute. In addition, the vector is inputted into a machine learning-based classification model to generate a second score. The second score can also characterize the artifact as being malicious or benign to access, execute, or continue to execute. The second score is then modified based on the first score to result in a final score. The final score can then be provided to a consuming application or process.

The deep generative model can be a likelihood-based model. In some variations, the likelihood-based model includes a variational autoencoder and/or a normalizing flow.

The anomaly detection model can form part of an ensemble of models including at least one machine learning model selected from a group consisting of: a logistic regression model, a neural network, a convolutional neural network, a recurrent neural network, a generative adversarial network, a support vector machine, a random forest, and/or a Bayesian model.

Features in the vector can be reduced prior to the vector being input into the anomaly detection model and/or the classification model using a feature reduction operation. The feature reduction operation can include one or more of random projection, feature hashing, deterministic principal component analysis, or stochastic principal component analysis.

The modifying can include combining the first score and the second score.

The modifying can include overriding the second score when the first score is above a threshold. In such cases, the second score can be replaced with a baseline or previous score as the final score.

The modifying can include applying a weight to the second score that is variable and based on the first score.

In some variations, a plurality of different vectors are created which, in turn, are analyzed by corresponding classification models and/or anomaly detection models. The weighing of the outputs of the classification models as used to generate the final score can be vary and be based on the first score(s).

The modifying can include applying a weight to the second score that is variable and based on the first score and combining the weighted second score with a baseline score.

The modifying can include transmitting the vector to a second classification model for classification when the first score is above a threshold, wherein the output of the second classification model is used to generate the final score. The second classification model can be more computationally intensive than the classification model. The second classification model is executed by a computing device also executing the classification model. Alternatively, the second classification model can be executed by a computing device that is remote from a computing device executing the classification model.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides more precise classification of artifacts as being potentially malicious as compared to conventional techniques.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
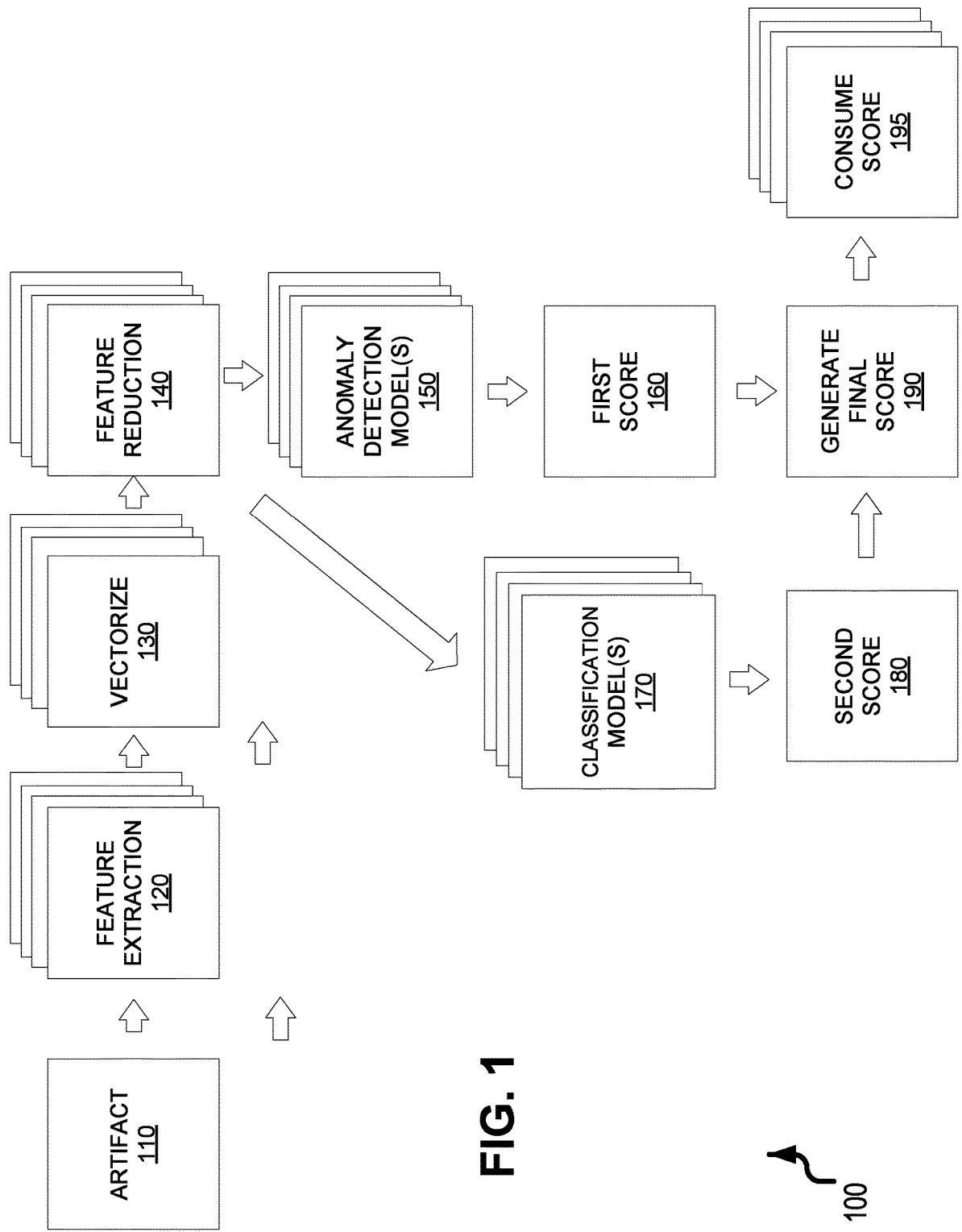
FIG. 1 is a diagram illustrating a computer-based workflow for characterizing an artifact as being malicious or benign.

The current subject matter is directed to enhanced techniques for detecting malware (e.g., malicious code, etc.) using deep generative models. Once malware is detected in a file using such models, a corrective action can be taken such as preventing access to such file, ceasing execution of such file, and/or quarantining the file, and the like.

A discriminative model estimates the probability p(y|x), where y is a response (such as a label) and x is a feature vector. In contrast, a generative model estimates p(x), where x is a vector of features (and note that, if desired, one of those features may be a label y). Classical examples of discriminative models include regressions and multi-layer perceptrons. Classical examples of generative models include exponential family distributions and mixture models.

Among the benefits of generative models, relative to discriminative models, is that they allow one to compute anomaly scores for new samples. A discriminative model has no sense of whether a feature vector, x, is normal or abnormal, because the model takes x to be given. In contrast, a generative model can evaluate whether a sample of features (again, including the class label if desired) is abnormal.

As provided herein, for malware detection products, these assessments of anomaly are invaluable. One would have greater confidence in the characterization of a machine learning (ML) system, or in one of its components, if the corresponding features of the file appear to be typical rather than if those features appear to be anomalous. Highlighted here are two scenarios where such an assessment of "trust" can enhance classification: when protecting against adversarial attacks, and when ensembling multiple models into a single score.

Adversarial attacks on ML-based anti-virus products may involve mutating the features of bad files until they get characterized as "good" by the product. If the attack is successful, then the file can pass through an ML-based anti-virus product which solely uses a discriminative model. However, consider that these creations can produce a manufactured combination of features that look highly unusual. For example, one may perform a "string stuffing" attack, whereby one appends to the end of a malicious file many strings that are typically indicative of goodness (such as terms related to video games). This produces a file with a bizarre combination of features, and that file would get flagged by a high-quality anomaly detector.

Now consider a multimodal malware detection system, which integrates information across multiple heterogenous sources of information. For example, in the context of malicious user detection, one may need to combine scores from various models (Process, Network, Keystrokes, Mouse, Logon, File, Registry, etc. . . . ). In the context of malware detection, one may need to combine scores from a static (i.e., pre-execution, etc.) model and a dynamic (i.e., post-execution, etc.) model. In such examples, scores from multiple classifiers must be combined into a final judgment. When doing so, each classifier's score can be weighted in accordance with the level of anomalousness of that classifier's inputs (with higher anomalies leading to lower weights). This strategy is sensible because the high anomaly scores suggest that the inputs are out-of-distribution, and therefore inherently unknown to the classifier model. Note that in the case where a prior or baseline score also contributes to the final judgement, then as the level of anomaly increases across all classifiers, the final judgement will look more and more like the prior or baseline score.

Thus, anomaly detection is a critical piece of a malware detection system. Files, file snapshots, artifacts, etc. classified as "good" but "anomalous" warrant a lower degree of trust. On an endpoint, such files may need to get blocked, or temporarily quarantined, or may warrant further processing by a more expensive model, a system operator, or a malware analyst. In contrast, files classified as "good" and "normal" warrant a higher degree of trust, making it more reasonable to let them run without further inspection. Moreover, in a complex multimodal malware detection system which integrates information from multiple classifiers, the level of anomalousness of a given modality can be used to weigh the contribution of that modality towards the final judgment on whether the file needs to get blocked, or temporarily quarantined, or warrants further processing by a more expensive model, a system operator, or a malware analyst.

Existing methods for identifying anomalous computer files have limited expressivity (i.e., ability to capture complex structure in the data, etc.) due to their use of simple generative models, such as Gaussians or mixture of Gaussians, or distance measures derived thereof, such as Mahalanobis distance. With the current subject matter, anomaly detection can be performed on computer files by using deep generative likelihood-based models. Deep generative models as used herein provide a rich class of density estimators; in particular, they compose probabilistic models with deep neural networks to construct models that are expressive and scalable to high-dimensional inputs.

There are generally two classes of deep generative models: Generative Adversarial Networks (GANs) and Likelihood-Based Models. The current subject focuses on likelihood-based models, because they provide a natural way to score the level of anomaly of new samples. In turn, there are three major subclasses of likelihood-based models: autoregressive models, variational autoencoders (VAEs), and normalizing flows. While any of the subclasses can be utilized, the current subject matter focuses on VAEs and normalizing flows, because autoregressive models are difficult to parallelize. Details are provided below with regard to how VAE and normalizing flow models can be used to identify anomalous computer files.

FIG. 1 is a process flow diagram 100 illustrating a sample computer-implemented workflow for classifying an artifact as being malicious or benign. Initially, an artifact 110 can be received (e.g., accessed, loaded, received from a remote computing system, etc.). The artifact 110 can be a file, a portion of a file, metadata characterizing a file, and/or source code. This artifact 110 can be parsed or otherwise processed by an observer. In particular, the observer can extract 120 features (sometimes referred to as attributes or observations) from the artifact and vectorize 130 such features. Further, depending on the complexity and/or quantity of features within a vector, a feature reduction operation 140 can be performed on the vector which reduces the amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.). The vector with the reduced features can then be input into one or more anomaly detection models 150. As will be described in further detail below, the anomaly detection models 150 can include a deep generative model.

The output of the anomaly detection models 150 can be a first score 160. As used herein, unless otherwise specified, the first score 160 (and additionally the second score 180) can be a numeric value, a classification type or cluster, or other alphanumeric output which, in turn, can be used directly or indirectly (after being combined 190 with a second score as described below) by a consuming process or application 195 to take some subsequent action. For malware applications, the final score 190 (which can be a combination of the first score 160 and the second score 180, a variation of the second score 180 based on the first score 160, yet another score, etc.) can be used to determine whether or not to access, execute, continue to execute, quarantine, or take some other remedial action which would prevent a software and/or computing system from being infected or otherwise infiltrated by malicious code or other information encapsulated within the artifact 110.

In some cases, the score 160 can be consumed by one or more classification models 170 which then generate a second score 180 which can then be used by directly or indirectly (after being combined with the first score 160 at 190) a consuming process or application 195 (instead of the consuming process or application 195 using the first score). For example, the first score 160 along with the reduced features 140 to improve precision of the classification models 170. The classification models 170 can take various forms including, without limitation, a deep generative model, a logistic regression model, a neural network (including convolutional neural networks, recurrent neural networks, generative adversarial networks, etc.), a support vector machine, a random forest, a Bayesian model, and the like, or some combination.

In the cases of the final score generation 190, various weighting can be applied to the first score 160 and the second score 180. The anomaly detection models 150 can be used to provide insight into how much the output of the classification models 170 can be trusted. For example, if the first score 160 (i.e., the anomaly score) is sufficiently high, then the second score 180 (the classification) can be overridden during the combining 190. Overridden can, for example, including replacing the second score 180 with a baseline or prior or default score. The baseline score can be low (in the direction of a malicious classification) when in an environment where one expects malicious files as a default, when one has contextual information suggestive of maliciousness, and/or where the decision-making tradeoffs favor being aggressive over being conservative (i.e. one wants to avoid false negatives—missing malware—at all costs).

The baseline score can be high (in the direction of a benign classification) when in an environment where one expects benign files as a default, when one has contextual information suggestive of benignness, and/or where the decision-making tradeoffs favor being conservative over being aggressive (i.e. one wants to avoid false positives—calling good files malware—at all costs).

In some cases, for the final score generation 190, the second score 180 can be combined with a baseline score and the weighting can be based on the first score 160. For example, the higher the level of anomaly as indicated by the first score 160, the greater the weight given to the baseline score.

If the first score 160 (the anomaly score), the classification model score 180 can be overridden with an unknown indication. Consider, for instance, a classifier trained to map a picture of a flower into its name. If that classifier suddenly gets a picture of car, it can be configured so as to not return the name of the flower in its list of possible flowers that happens to best match the image; rather it can report that "unknown".

In further cases, if the first score 160 is sufficiently high, additional processing can be recruited. For example, a more computationally intensive model can be used. Such a model can be local or optionally remote (i.e., cloud-based rather than on a local client). For example, this model can perform a deeper dive into the file (like a script analysis, or a decompilation, etc.) that costs extra money or time to run, so it should only be recruited when necessary. In some cases, a high first score 160 may flag the artifact 110 for manual inspection/investigation.

In some implementations, there can be an ensemble of anomaly detection models 150 and/or an ensemble of classification models 170. When using an ensemble, there can be different types of vectors 130 and the combining, at 190, can be configured so that the first scores 160 can be used to provide weights against the second scores 180 to reach the final, combined score. As an example, in the context of malware classification, suppose you have Vectors A based on static file features (what can be extracted pre-execution of the file) and Vectors B based on dynamic file features (what happens during execution of the file). Suppose that these get separately reduced into Reduced Vectors A and Reduced Vectors B, and then fed into Classifier A (on Static Features) and Classifier B (on Dynamic Features). Suppose further that Anomaly Detector A (on Static Features) produces a high score. Then, it would be desirable to downweight (or fully ignore) the decision of Classifier A when combining Classifier Score A and Classifier Score B into the final score.

In the context of malicious user detection, suppose there are vectors V1, V2, V3, . . . for different modalities (Process, Network, File, Registry, etc. . . . ). These vectors V1, V2, V3, . . . can be fed into classification models C1, C2, C3, . . . , one for each modality. These same vectors V1, V2, V3, . . . can be fed into anomaly detector models A1, A2, A3, . . . , one for each modality. The output of the classification models C1, C2, C3, . . . can be combined into a final decision. Lower weights can be placed on the classifier scores that come from modalities with higher anomaly scores, because the high anomaly scores suggest that the vectors are out-of-distribution, and therefore inherently unknown to the classifier model.

Variational Autoencoders. For ease of illustration, an example variational autoencoder is provided herein that applies i.i.d assumptions and Gaussian distributions (and therefore real-valued observations) throughout.

Probabilistic model. Consider a parametric frequentist latent variable model, with real-valued observations $x=(x^{(i)})_{i=1}^{N}$, latent variables $z=(z^{(i)})_{i=1}^{N}$, and parameter $\theta$. Note that each $x^{(i)} \in \mathbb{R}^d$ and $z^{(i)} \in \mathbb{R}^k$ for some observed data dimensionality, d, and some latent variable dimensionality, k.

Observations x can be modeled via the factorization $$p_\theta(x|z) = \prod_i p_\theta(x^{(i)}|z^{(i)})$$

Let the likelihood of each observation $x^{(i)}$ be obtained by using a Multi-Layer Perceptron (MLP), parameterized by weights $\theta$, to map latent variable $z^{(i)}$ to Gaussian parameters governing the distribution of observation $x^{(i)}$.

$$x^{(i)}|z^{(i)},\theta \sim \mathcal{N}(\mu_x^{(i)}(z(i);\theta), \Sigma_x^{(i)}(z^{(i)};\theta))$$

As the MLP maps latent variables, z, to the parameters of a probability distribution over observed data, x, this aspect of MLP can referred to as a probabilistic decoder.

A prior distribution can be additionally put on the latent variables:

$$p_\theta(z) = \prod_i p_\theta(z^{(i)})$$

$$z^{(i)} | \theta \sim \mathcal{N}(0, I)$$

And it can be assumed, as in the context of a frequentist latent variable model, that θ is a fixed (but unknown) constant that will be learned.

In this case, the posterior distribution, $p_\theta(z|x)$, is intractable. However, an approximation can be considered by using a Multi-Layer Perceptron (MLP), parameterized by weights φ, to map observation x to Gaussian parameters governing the distribution of latent variable z:

$$q_{(\phi)}(z|x) = \prod_i q_{(\phi)}(z^{(i)} | x^{(i)})$$

$$z^{(i)} | x^{(i)}, \phi \sim \mathcal{N}\left(\mu_{z^{(i)}}(x^{(i)}; \phi), \underset{z^{(i)}}{\Sigma}(x^{(i)}; \phi)\right)$$

As the MLP maps observations, x, to the parameters of a probability distribution over latent variables, z, this aspect of an MLP can be referred to as a probabilistic encoder (this can also be referred to as a recognition model).

Note that the probabilistic encoder can be therefore be regarded as an approximation to the posterior distribution over latent variables which results from using the probabilistic decoder as a likelihood.

Probabilistic encoding. It can, for example, be specifically assumed that an observation $x^{(i)}$ can be probabilistically encoded into latent variable $z^{(i)}$ via the following process $$h^{(i)} = \tanh(W_1 x^{(i)} + b_1)$$

$$\mu_z^{(i)} = W_{21} h^{(i)} + b_{21}, \log \sigma_z^{(i)2} = W_{22}^{(i)} + b_{22}$$

$$z^{(i)} \sim \mathcal{N}(\mu_z^{(i)}, \Sigma_z^{(i)}), \text{ where diag}(\Sigma_z^{(i)}) = \sigma_z^{(i)2}$$

where ($W_1$, $W_{21}$, $W_{22}$) are the weights and ($b_1$, $b_{21}$, $b_{22}$) are the biases of a Multi-Layer Perceptron (MLP). Letting φ:=($W_1$, $W_{21}$, $W_{22}$, $b_1$, $b_{21}$, $b_{22}$), the trained encoder can be used to define the approximate posterior, $q_\phi(z|x)$.

Probabilistic decoding. It can, for example, be specifically assumed that a latent variable $z^{(i)}$ can be probabilistically decoded into observation $x^{(i)}$ via the following process $$h^{(i)} = \tanh(W_3 z^{(i)} + b_3)$$

$$\mu_x^{(i)} = W_{41} h^{(i)} + b_{41}, \log \sigma_x^{(i)2} = W_{42} h^{(i)} + b_{42}$$

$$x|z \sim \mathcal{N}(\mu_x^{(i)}, \Sigma_x^{(i)}), \text{ where diag}(\Sigma_x^{(i)}) = \sigma_x^{(i)2}$$

where ($W_3$, $W_{41}$, $W_{42}$) are the weights and ($b_3$, $b_{41}$, $b_{42}$) are the biases of a Multi-Layer Perceptron (MLP). Letting θ:=($W_3$, $W_{41}$, $W_{42}$, $b_3$, $b_{41}$, $b_{42}$), we may use the trained decoder can be used to define the likelihood, $p_\theta(x|z)$.

Inference. Variational inference can be used to jointly optimize (θ, φ). For example, in our sample implementation, we have θ=($W_3, W_{41}, W_{42}, b_3, b_{41}, b_{42}$) generative parameters φ=($W_1, W_{21}, W_{22}, b_1, b_{21}, b_{22}$) variational parameters In particular, $\mathcal{F}(\theta, \phi; x)$, a lower-bound on the marginal likelihood, $p_\theta(x)$, can be constructed via the entropy/energy decomposition as provided in variational inference:

$$\mathcal{F}(\theta, \phi; x) = \mathbb{E}_{q_\phi(z|x)}[-\log q_\phi(z|x)) + \log p_\theta(x,z)]$$

The model can be trained by performing stochastic gradient descent on the variational lower bound $\mathcal{F}$. During training, an objective function can be approximated by performing a Monte Carlo approximation of the expectation. Given minibatch $x^{(i)}$, L samples can be taken from $q_\phi(z|x^{(i)})$ to obtain the following estimator:

$$\mathcal{F}(\theta, \phi; x^{(i)}) \approx \frac{1}{L}\sum_{l=1}^{L} -\log q_\phi(z^{(i,l)} | x^{(i)}) + \log p_\theta(x^{(i)}, z^{(i,l)})$$

Note that naively backpropagating gradients in this case would ignore the role of the parameter in the sampling step. However, a reparameterization trick can be utilized that is, a differentiable transformation $g_\phi$ of parameterless distribution p(∈) is constructed such that $g_\phi(\epsilon, x^{(i)})$ has the same distribution as $q_\phi(z^{(i)}|x^{(i)})$. Using this trick, L samples {$\epsilon_1, \ldots, \epsilon_L$} can be taken from p(∈) to obtain the estimator:

$$\mathcal{F}(\theta, \phi; x^{(i)}) \approx \frac{1}{L}\sum_{l=1}^{L} -\log q_\phi(g_\phi(\epsilon^{(l)}, x^{(i)}) | x^{(i)}) + \log p_\theta(x^{(i)}, g(\epsilon^{(l)}, x^{(i)}))$$

Anomaly Scoring. The anomalousness of sample $x^{(i)}$ can be assessed using a variational autoencoder as follows. First, take L samples, {$z^{(i,1)}, \ldots, z^{(i,L)}$} from the fitted variational distribution (i.e, the encoder), $q_\phi(z^{(i)}|x^{(i)})$. Each such sample, $z^{(i,l)}$, determines a specific form of the fitted likelihood (i.e. the decoder) by specifying its parameters, $p_\theta(x^{(i)}|z^{(i,l)}) = p_\theta(x^{(i)}|\mu_x^{(i)}(z^{(i,l)}))$. Using this, the reconstruction probability of the sample can be defined as the mean of these likelihoods:

$$\text{reconstruction probability}(x^{(i)}) := \frac{1}{L}\sum_{l=1}^{L} p_\theta\left(x^{(i)} | \mu_{x^{(i)}}(z^{(i,l)}), \underset{x^{(i)}}{\Sigma}(z^{(i,l)})\right)$$

Turning now to variations of malware anomaly detection variations using normalizing flows.

Density estimation and change of variables. Consider a parametric function mapping continuous random variable X to continuous random variable Z $$f_\theta: X \to Z$$

$$x \mapsto z$$

where x is an observed sample and z is a latent variable. Suppose the density $p_z$ is given. Then by the change of variables theorem, the density of an observed sample x is given by $$p_X(x) = p_Z(f_\theta(x))\left|\det\frac{\partial f_\theta(x)}{\partial x}\right|$$

The goal of density estimation can be posed as follows: learn θ to model unknown data density $p_x$ in terms of assumed latent variable density $p_z$.

Normalizing Flow. A normalizing flow, $f=h_\theta^1 \circ \ldots \circ h_\theta^k$, is a sequence of invertible transformations which maps an observed data point, x, to a latent state representation, z.

If it is provided that $$h_\theta^0):=x$$

$$h_\theta^K:=z$$

Then, since $\det \Pi_i A_i = \Pi_i \det A_i$, the likelihood becomes $$p_X(x) = p_Z(f_\theta(x)) \prod_{k=1}^{K} \left| \det \frac{\partial h_\theta^k}{\partial h_\theta^{k-1}} \right|$$

Real NVP. A real NVP is a normalizing flow as provided above where $f=h_\theta^1 \circ \ldots \circ h_\theta^k$ is structured such that:

$$h^{i+1} = b^i \odot h^i + (1-b^i) \odot (h^i \odot \exp(s_\theta^i(b^i \odot h^i)) + t_\theta^i(b^i \odot h^i))$$

where $b^1, \ldots, b^K$ is a sequence of binary masks, $\odot$ is the Hadamard product or element-wise product, and s and t stand for scale and translation.

Affine coupling layer. An affine coupling layer is one element of the sequence of invertible transformations in a real NVP; i.e. it is $h_i$ for some $i \in \{1, \ldots, K\}$.

If random variables are D dimensional, and $b^i := [1, \ldots 1, 0, \ldots 0]$, where the 0 entries begin at the $d_{i+1}$st element, then the affine coupling layer is given by $$h_{1:d_i}^{i+1} = h_{1:d_i}^i$$

$$h_{1:d_i+1:D}^{i+1} = h_{1:d_i+1:D}^i \odot \exp(s_\theta^i(h_{1:d_i}^i)) + t_\theta^i(h_{1:d_i}^i)$$

Note that the real NVP allows for efficient computation of the determinant of the Jacobians, because:

$$\frac{\partial h_\theta^{i+1}}{\partial h_\theta^i} = \begin{pmatrix} \mathbb{I}_d & 0 \\ \frac{\partial h_{d_i+1:D}^{i+1}}{\partial h_{d_i+1:D}^i} & \text{diag}(\exp(s_\theta(h_{1:d_i}^i))) \end{pmatrix}$$

The bottom left term can be arbitrarily complex and does not necessarily have to be computed because the determinant of a triangular matrix is the product of the diagonals:

$$\det \frac{\partial h_\theta^{i+1}}{\partial h_\theta^i} = \exp\left(\sum_j s_\theta^i(h_{1:d_i}^i)_j\right)$$

So, by the likelihood equation above, the log likelihood with real NVP normalizing flow applied to a single data sample, x, is $$\log p_X(x) = \log p_Z(f_\theta(x)) + \sum_i \sum_j s_\theta^i(h_{1:d_i}^i)_j$$

And the log likelihood applied for a collection of samples, assumed i.i.d, is the sum of individual log likelihoods.

Figure 2:
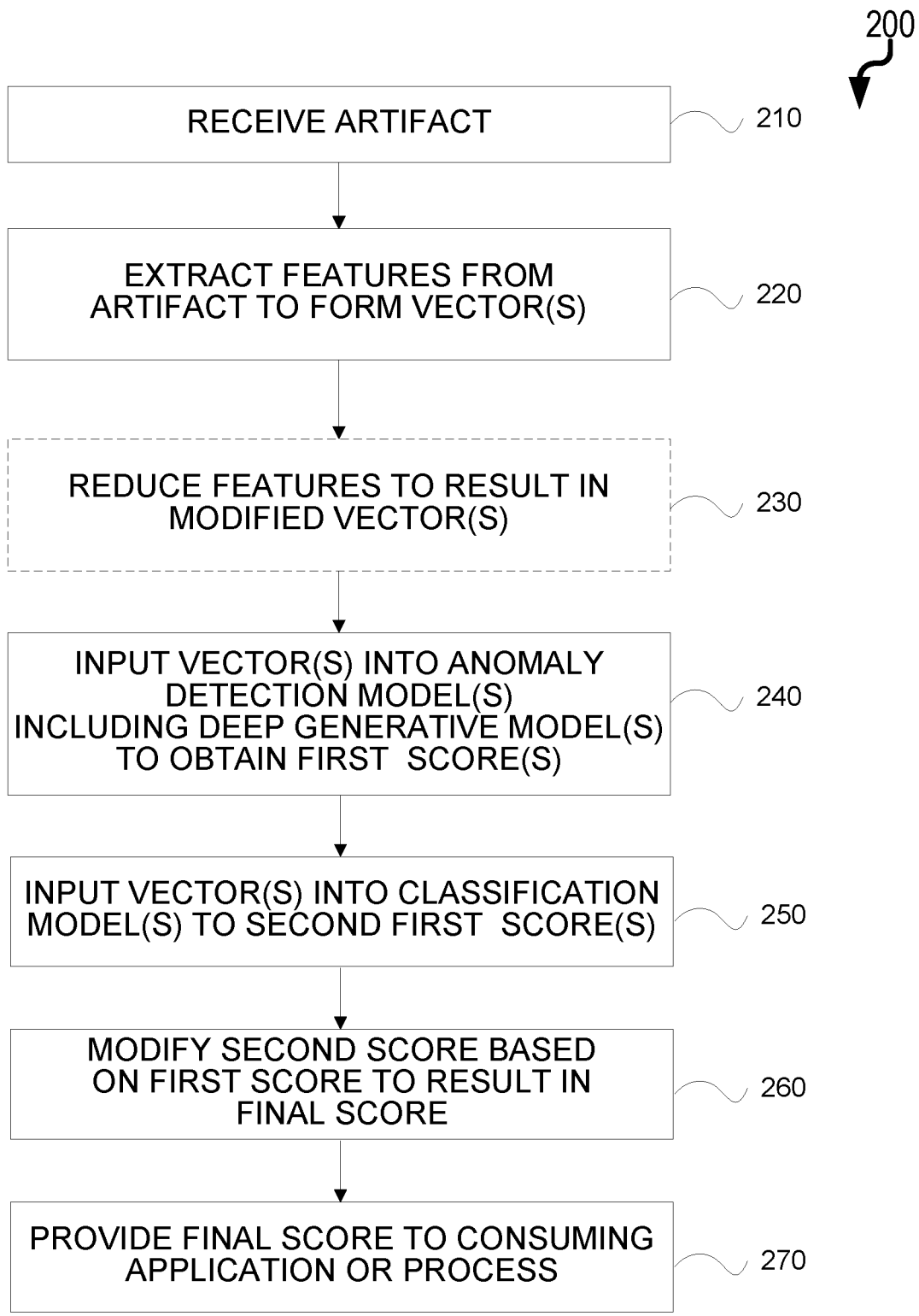
FIG. 2 is a process flow diagram illustrating malware detection using deep generative models.

FIG. 2 is a diagram 200 in which, at 210, an artifact is received. Thereafter, at 220, features are extracted from the artifact so that a vector can be populated. Optionally, at 230, the features in the vector can be reduced using one or more feature reduction operation. The vector is then inputted, at 240, into an anomaly detection model comprising a deep generative model to generate a first score. The first score can characterize the artifact as being malicious or benign to access, execute, or continue to execute. In addition, at 250, the vector is inputted into a machine learning-based classification model to generate a second score. The second score can also characterize the artifact as being malicious or benign to access, execute, or continue to execute. The second score is then modified, at 260, based on the first score to result in a final score. The final score can then be provided, at 270, to a consuming application or process.

Figure 3:
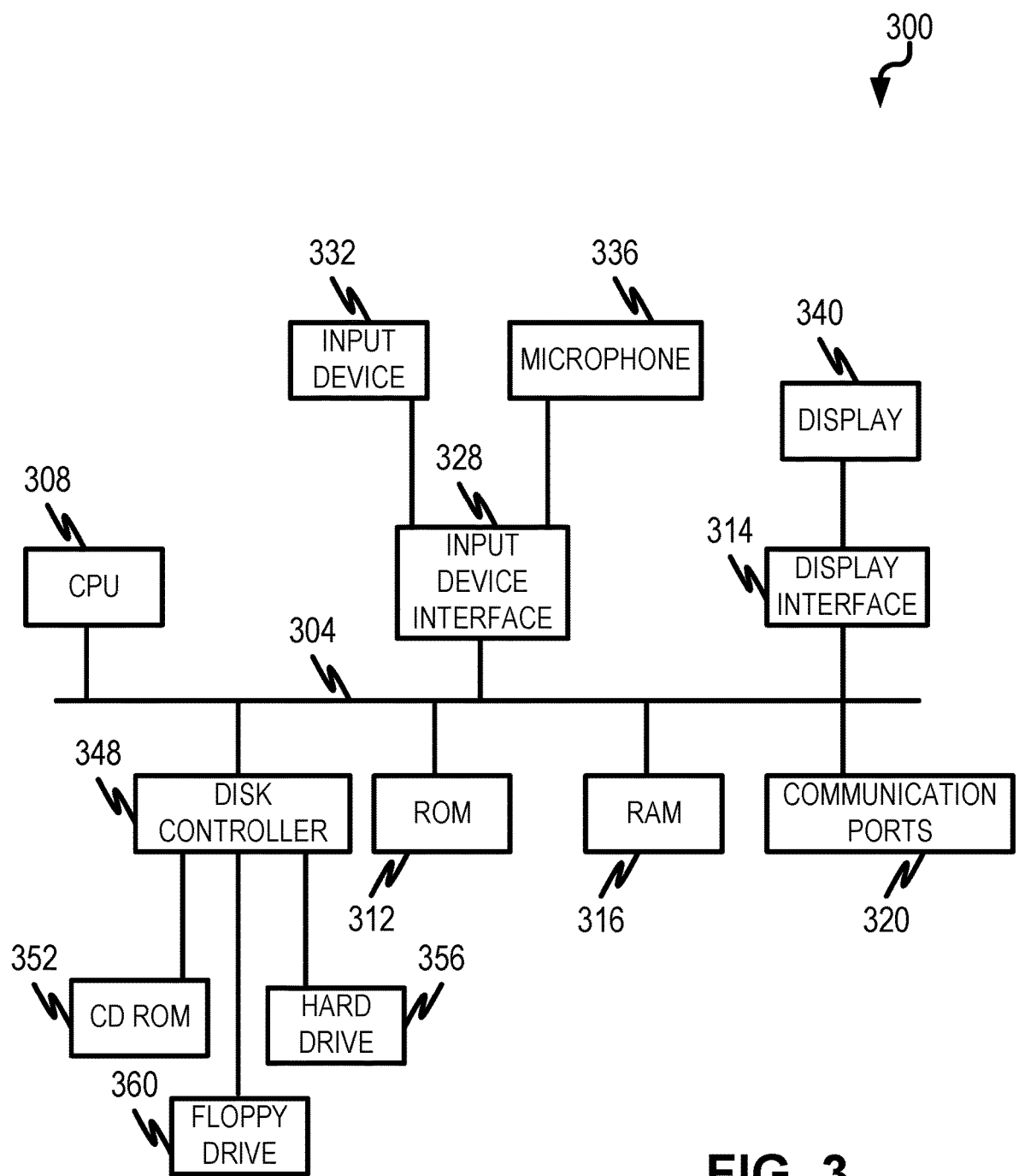
FIG. 3 is a diagram illustrating a computing device that can be used to implement aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for execution by one at least one computing device having one or more processors and memory, the method comprising:
   receiving, by the at least one computing device, an artifact;
   extracting, by the at least one computing device, features from the artifact and populating a vector;
   inputting, by the at least one computing device, the vector into an anomaly detection model comprising a deep generative model to generate a first score, the first score characterizing the artifact as being malicious or benign to access, execute, or continue to execute;
   inputting, by the at least one computing device, the vector into a machine learning-based classification model to generate a second score, the second score characterizing the artifact as being malicious or benign to access, execute, or continue to execute;
   modifying, by the at least one computing device, the second score based on the first score to result in a final score; and
   providing, by the at least one computing device, the final score to a consuming application or process to determine, based on the final score, whether or not to access the artifact, execute, continue to execute the artifact, quarantine the artifact, or take a remedial action in relation to the artifact to prevent software or a computing system from being infected or otherwise infiltrated by malicious code or other information encapsulated within the artifact.

2. The method of claim 1, wherein the deep generative model is a likelihood-based model.

3. The method of claim 2, wherein the likelihood-based model comprises a variational autoencoder.

4. The method of claim 2, wherein the likelihood-based model comprises a normalizing flow.

5. The method of claim 1, wherein the anomaly detection model forms part of an ensemble of models including at least one machine learning model selected from a group consisting of: a logistic regression model, a neural network, a convolutional neural network, a recurrent neural network, a generative adversarial network, a support vector machine, a random forest, or a Bayesian model.

6. The method of claim 1 further comprising:
   reducing features in the vector prior to the vector being input into the anomaly detection model using a feature reduction operation.

7. The method of claim 6, wherein the feature reduction operation comprises random projection or feature hashing.

8. The method of claim 6, wherein the feature reduction operation comprises deterministic or stochastic principal component analysis.

9. The method of claim 1, wherein the modifying comprises combining the first score and the second score.

10. The method of claim 1, wherein the modifying comprises overriding the second score when the first score is above a threshold.

11. The method of claim 10 further comprising:

replacing the second score with a baseline score as the final score.

12. The method of claim 1, wherein the modifying comprises applying a weight to the second score that is variable and based on the first score.

13. The method of claim 1, wherein there are a plurality of vectors and there are a plurality of classification models and wherein the model comprises applying a varying weight to each of the classification models based on the first score.

14. The method of claim 1, wherein the modifying comprises applying a weight to the second score that is variable and based on the first score and combining the weighted second score with a baseline score.

15. The method of claim 1, wherein the modifying comprises:

transmitting the vector to a second classification model for classification when the first score is above a threshold, wherein an output of the second classification model is used to generate the final score.

16. The method of claim 15, wherein the more second classification model is more computationally intensive than the classification model.

17. The method of claim 15, wherein the second classification model is executed by a computing device also executing the classification model.

18. The method of claim 15, wherein the second classification model is executed by a computing device remote from a computing device executing the classification model.

19. A system comprising:
at least one data processor; and
memory comprising instructions, which when executed by the at least one data processor, result in operations comprising:
receiving an artifact;
extracting features from the artifact and populating a vector;
inputting the vector into an anomaly detection model comprising a deep generative model to generate a first score, the first score characterizing the artifact as being malicious or benign to access, execute, or continue to execute;
inputting the vector into a machine learning-based classification model to generate a second score, the second score characterizing the artifact as being malicious or benign to access, execute, or continue to execute;
modifying the second score based on the first score to result in a final score; and
providing the final score to a consuming application or process.

20. A non-transitory computer program product comprising instructions which, when executed by at least one computing device, result in operations comprising:
receiving an artifact;
extracting features from the artifact and populating a vector;
inputting the vector into an anomaly detection model comprising a deep generative model to generate a first score, the first score characterizing the artifact as being malicious or benign to access, execute, or continue to execute;
inputting the vector into a machine learning-based classification model to generate a second score, the second score characterizing the artifact as being malicious or benign to access, execute, or continue to execute;
modifying the second score based on the first score to result in a final score; and
providing the final score to a consuming application or process.

* * * * *